US009126578B2

(12) United States Patent
Ott et al.

(10) Patent No.: US 9,126,578 B2
(45) Date of Patent: Sep. 8, 2015

(54) COOLING-BASED POWER LIMITING SYSTEM AND METHOD

(71) Applicant: Caterpillar Inc., Peoria, IL (US)

(72) Inventors: Steven Ott, Washington, IL (US); Adam Nackers, East Peoria, IL (US); Kevin Davis, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 140 days.

(21) Appl. No.: 13/750,406

(22) Filed: Jan. 25, 2013

(65) Prior Publication Data

US 2014/0214289 A1 Jul. 31, 2014

(51) Int. Cl.
*B60W 10/10* (2012.01)
*B60W 10/06* (2006.01)
*F16H 59/78* (2006.01)

(52) U.S. Cl.
CPC .............. *B60W 10/10* (2013.01); *B60W 10/06* (2013.01); *F16H 59/78* (2013.01); *B60W 2300/17* (2013.01); *B60W 2510/0638* (2013.01); *B60W 2510/0676* (2013.01); *B60W 2510/105* (2013.01); *B60W 2510/106* (2013.01); *B60W 2510/1035* (2013.01); *Y10T 477/619* (2015.01); *Y10T 477/653* (2015.01)

(58) Field of Classification Search
CPC ................................. B60W 2510/0676; B60W 2510/105–2510/107; B60W 2300/17; F16H 59/78
USPC ............................................... 477/98; 701/54
See application file for complete search history.

(56) References Cited

U.S. PATENT DOCUMENTS

| | | | | |
|---|---|---|---|---|
| 4,325,330 A | | 4/1982 | Kugler et al. | |
| 4,819,187 A | * | 4/1989 | Yasue et al. | 701/99 |
| 4,875,391 A | * | 10/1989 | Leising et al. | 477/155 |
| 5,245,966 A | * | 9/1993 | Zhang et al. | 123/339.19 |
| 5,319,555 A | * | 6/1994 | Iwaki et al. | 701/57 |
| 5,325,740 A | * | 7/1994 | Zhang et al. | 477/110 |
| 5,383,824 A | * | 1/1995 | Runge et al. | 477/110 |
| 5,514,047 A | * | 5/1996 | Tibbles et al. | 477/46 |
| 5,601,511 A | * | 2/1997 | Michioka | 477/98 |
| 6,026,921 A | * | 2/2000 | Aoyama et al. | 180/65.25 |
| 6,315,693 B1 | | 11/2001 | Tayama | |
| 6,591,811 B2 | * | 7/2003 | Kaltenbrunn et al. | 123/435 |
| 7,041,018 B2 | | 5/2006 | Ochiai et al. | |
| 7,223,205 B2 | * | 5/2007 | Etchason et al. | 477/98 |
| 2009/0118090 A1 | * | 5/2009 | Heap et al. | 477/98 |
| 2011/0124462 A1 | * | 5/2011 | Meyer et al. | 475/271 |
| 2012/0004814 A1 | * | 1/2012 | Hyodo et al. | 701/50 |

* cited by examiner

*Primary Examiner* — Tuan C. To
*Assistant Examiner* — Donald J Wallace
(74) *Attorney, Agent, or Firm* — Leydig, Voit & Mayer, Ltd.

(57) ABSTRACT

A machine includes an engine and an engine cooling system, which is associated with and configured to remove heat from the engine. A transmission is connected to the engine and configured to transmit engine power from the engine to a driven load. The transmission controls an amount of engine power transmitted to the driven load in response to a transmission command signal. A controller associated with the engine and the transmission provides the transmission control signal. The controller is disposed to determine an engine operating condition, determine a transmission operating condition, and adjust the transmission command signal to reduce the amount of engine power transmitted to the driven load when the engine operating condition indicates that the engine cooling system removes insufficient heat from the engine.

17 Claims, 5 Drawing Sheets

COOLING-BASED POWER LIMITING SYSTEM AND METHOD

TECHNICAL FIELD

This patent disclosure relates generally to powertrains that include engines connected to transmissions and, more particularly, to transmission power management systems and methods.

BACKGROUND

Earthmoving machines typically operate in various environments and perform various tasks. Certain tasks require the machine to pull or push heavy loads at low ground speeds and at various inclinations for prolonged periods. Examples of such machines include motor graders, pavers, bulldozers and other types of machines that can shape the earth, as well as machines that carry heavy loads such as trucks. In addition to operating under heavy load conditions, machines can often operate at extreme environments where high ambient temperatures are present.

To provide the required torque capability and to enable efficient and reliable operation, certain earthmoving-type machines are powered by internal combustion engines such as engines operating on diesel, natural gas, gasoline and/or other fuel types. In a typical application, the internal combustion engine is connected to and drives a transmission, which is capable of providing various gear ratios. Machine propel systems, i.e., systems configured for moving the machine along the ground, which can include wheels, tracks or other ground engaging member types, may receive power through the transmission.

Many different transmission types can be used to power machines. In certain applications, continuously variable transmissions may be used because of their flexibility in operating under many different gear ratios. Such capability is advantageous, especially in those machine applications that control engine speed within narrow ranges for efficiency, fuel economy, noise attenuation and other reasons. Thus, for a given engine speed, a continuously variable transmission (CVT) may be adjusted to provide a relatively slow ground speed at high torque and at relatively low engine speeds.

However, machines operating at low engine speeds and at high load, especially in hot ambient environments, have been known to cause overheating in the engine of the machine, especially if operation under such conditions is for prolonged periods. Engine overheating, which can lead to engine failure or seizing, in certain instances, is the result of insufficient cooling provided by an engine cooling system, which depends on active cooling of engine coolant through a radiator to maintain proper engine temperature. As is known from typical applications, engine cooling systems utilize ram air passing over a radiator when the machine is moving to provide convective cooling of the radiator. When the machine is motionless or slow moving, convective radiator cooling is promoted by an engine-operated fan, which may be electrically, mechanically or hydraulically driven.

Known systems address operation under conditions that may lead to engine overheating using passive means, for example, by alerting the operator of the engine overheating condition. If an engine overheating condition is not addressed, known systems include safety measures that can shut down the engine to avoid engine damage due to overheating. Apart from such passive measures, known systems are unable to address machine operation under conditions that can lead to engine overheating. To avoid such conditions, operator knowledge, experience and training are the best methods for avoiding machine damage.

SUMMARY

The disclosure describes, in one aspect, a machine that includes an engine and an engine cooling system associated with the engine and configured to remove engine heat from the engine. The machine further includes a transmission. The transmission is connected to the engine and configured to transmit engine power from the engine to a driven load. The transmission controls an amount of engine power transmitted to the driven load in response to a transmission command signal. The machine further includes a controller associated with the engine and the transmission. The controller provides the transmission control signal to the transmission. The controller is disposed to determine an engine operating condition, determine a transmission operating condition, and adjust the transmission command signal to reduce the amount of engine power transmitted to the driven load when the engine operating condition indicates that the engine cooling system removes insufficient heat from the engine.

In another aspect, the disclosure describes a cooling-based power limiting system. The system includes a power plant producing useable power and a cooling unit associated with the power plant and having a cooling capacity that depends on power plant operating conditions. The power limiting system further includes a driven system operating on the useable power, and a transmission. The transmission is connected between the power plant and the driven system and is configured to transfer power therebetween. The transmission implements a power limit when transferring power from the power plant to the driven system in response to a transmission power limit command. A controller associated with the power plant, the cooling unit and the transmission is configured to lower the power limit of the transmission when the power plant is operating under a condition in which the cooling capacity is insufficient to cool the power plant.

In yet another aspect, the disclosure describes a method for limiting power transmitted from an engine through a transmission in a machine powertrain. The engine is associated with a cooling system. The method includes operating the engine at an engine speed and engine load, and operating the transmission at a transmission ratio. A maximum transmission output power limit is determined using the engine speed as a primary control parameter based on a cooling capacity of the cooling system, and the transmission ratio is adjusted based on the maximum transmission output power.

DETAILED DESCRIPTION

This disclosure relates to power management systems for machines and, more particularly, to power management systems and methods for adjusting transmission power under certain machine operating conditions. The power management systems disclosed herein are effective in mitigating machine operation that can lead to engine overheating, especially under operating conditions having low engine speeds at high engine loads.

Figure 1:
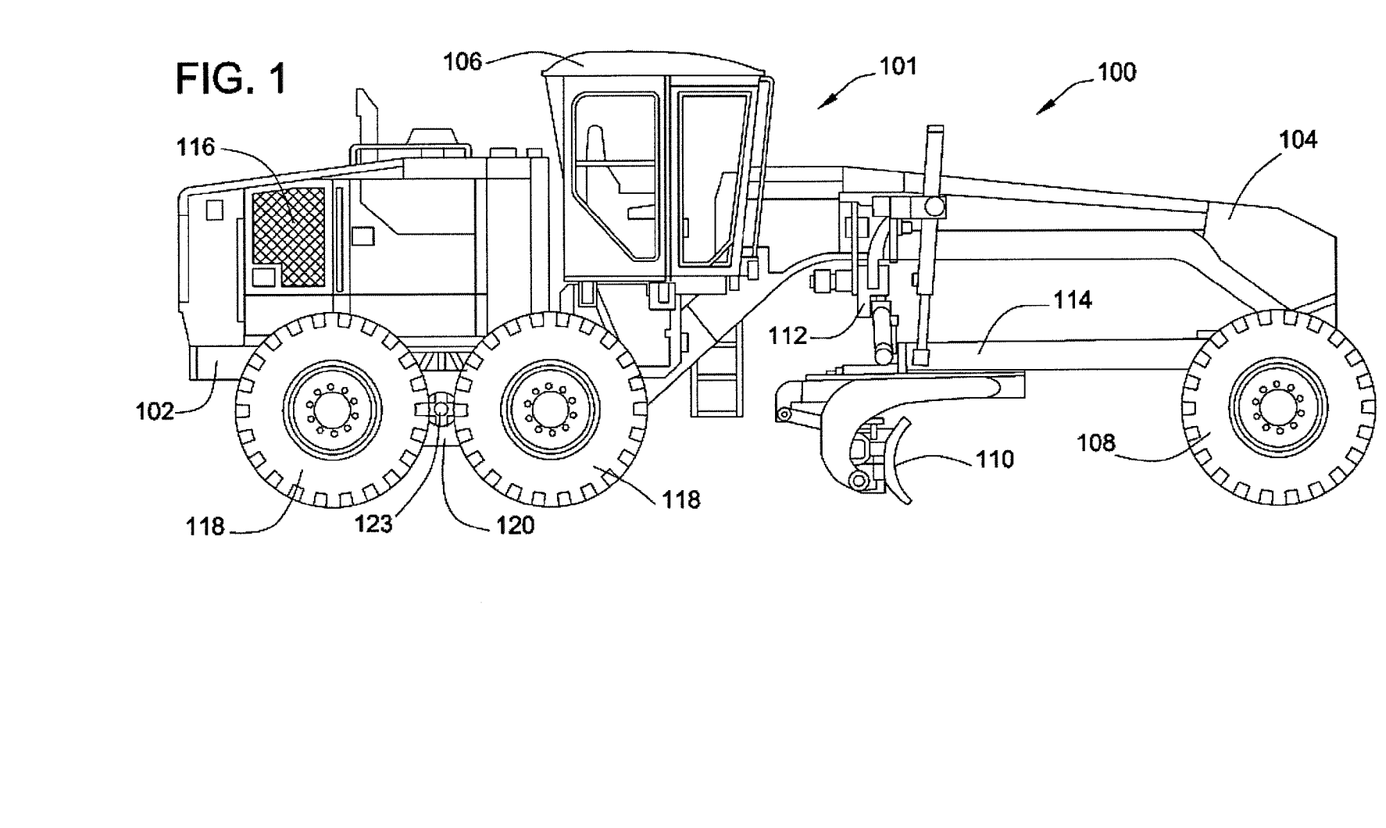
FIG. 1 is an outline view of an exemplary machine in accordance with the disclosure.

A side view of a machine 100, in this example a motor grader 101, is shown in FIG. 1. The term "machine" is used generically to describe any machine having at least one drive wheel that is directly driven by a motor connected to the wheel, for example, by use of electrical or hydrostatic power, or is alternatively driven by mechanical means by an engine through a transmission. The motor grader 101 shown in FIG. 1 generally includes a two-piece frame made up of an engine frame 102 and an implement portion 104. Alternatively, the motor grader 101 may include a single frame piece. The engine frame 102 in the embodiment shown is connected to the implement portion 104 by a pivot (not shown). The implement portion 104 includes an operator cab 106 and two idle wheels 108 (only one visible) that contact the ground. A shovel or blade 110 is suspended along a mid-portion of the implement portion 104. The blade 110 can be selectively adjusted to engage the ground at various heights and angles to achieve a desired grade or contour while the motor grader 101 operates. Adjustment of the position of the blade 110 is accomplished by a system of actuators, generally denoted in FIG. 1 as 112, while support for the loading experienced by the blade 110 during operation is accomplished by a bar 114, which pivotally connects the implement portion 104 to the blade 110.

The engine frame 102 supports an engine (shown and described relative to FIG. 2 below), which is protected from the elements by an engine cover 116. The engine provides the power necessary to propel the motor grader 101 as well as to operate the various actuators and systems of the motor grader 101. As can be appreciated, other machines may have different configurations and/or various other implements associated therewith. The engine cover 116 includes grates and other openings that allow air to pass over and cool engine components.

Figure 2:
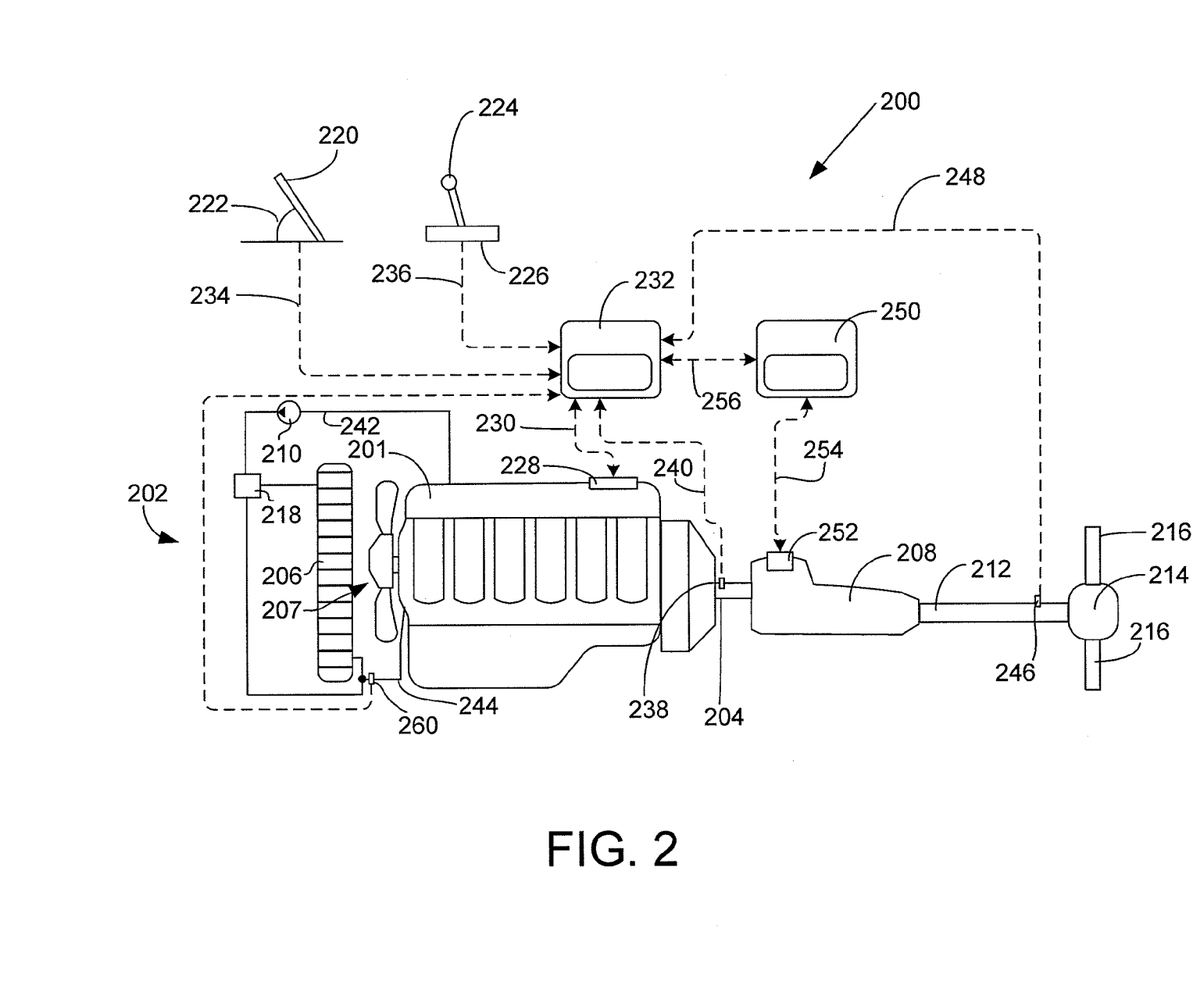
FIG. 2 is a block diagram for a machine powertrain in accordance with the disclosure.

FIG. 2 illustrates a powertrain 200 of the machine 100. The powertrain 200 includes an engine 201, which has an output shaft 204 connected to a transmission 208. An output shaft 212 of the transmission 208 is connected to a splitter 214 that powers two drive shafts 216. The drive shafts can be connected to other gears and/or drive system components (not shown), which are in turn connected to and drive the wheels 118 (FIG. 1) of the machine 100 either directly or indirectly. In alternative embodiments such as in tracked vehicle applications, the drive shafts 216 may directly or indirectly power sprockets that move tracks along the ground (not shown).

The powertrain 200 may further include control devices disposed within the operator cab 106 (FIG. 1). In the illustrated embodiment, the control devices include an accelerator or torque control pedal 220 having an accelerator pedal sensor (APS) 222 and a gear selector lever 224 having a lever encoder 226. The APS 222 and lever encoder 226 may be configured to provide signals indicative of the desired ground speed of the machine 100 that is commanded by an operator during use. Other control devices may also be included but have been omitted from the illustration for simplicity.

In the embodiment shown in FIG. 2, the engine 201 includes an interface 228 that is connected to a communication channel 230 with an engine governor 232. The engine governor 232 operates to monitor and control the function of various engine systems, such as monitor sensor readings from various engine sensors, control engine speed and load output and so forth, by receiving information and transmitting commands to various engine components through the communication channel 230. As shown, the engine governor 232, or another controller connected to the governor 232, is further connected to various vehicle components that can control engine operation. The governor 232 is embodied here as an electronic controller that includes a processor operably associated with other electronic components such as a data storage device and the various communication channels. A throttle communication channel 234 and a gear selection encoder communication channel 236 are connected to the governor 232 and configured to provide to the governor 232 information indicative of operator commands, such as the desired engine speed or load, the desired gear selection setting, the desired ground speed and/or engine speed of the machine, and the like. It should be appreciated that additional or alternative connections between the governor 232 and the various engine and/or vehicle systems may be present but are not shown for simplicity.

The governor 232 is further configured to receive information indicative of the operation of the remaining portion of the powertrain 200. In this way, the governor 232 is connected to an engine output shaft speed sensor 238 via an engine speed communication channel 240 and to a transmission output speed or powertrain sensor 246 via a transmission output speed communication channel 248.

The engine 201 further includes a cooling system 202, which essentially includes a radiator 206, a coolant pump 210, a thermostatic valve 218, and coolant supply and return lines 242 and 244. A sensor 260 is associated with the return line 244 and is communicatively connected to the governor 232 such that information indicative of engine coolant temperature is provided to the governor 232 during operation. When the engine 201 is operating, heated coolant may be circulated through the cooling system 202 by operation of the pump 210. The pump 210, although illustrated as being in-line with the supply coolant line 242, may alternatively be associated with the return line 244 and, further, may be an integrated engine component. When the coolant temperature provided by the engine 201 reaches a predetermined temperature, for example, about 190 deg. F. (about 88 deg. C.), the thermostatic valve 218 may route engine coolant through the radiator 206. Ram air passing over the radiator 206 caused by machine motion and/or air forced over the radiator 206 by an engine fan 207, may convectively remove heat from the radiator, thus lowering the temperature of engine coolant passing therethrough. At other times, the thermostatic valve 218, which may be mechanically or selectively operated, may bypass the radiator and return the engine coolant from the supply line 242 directly to the return line 244.

The powertrain 200 in the illustrated embodiment further includes a transmission controller 250 that is configured to control the operation of the transmission 208. Accordingly, the transmission controller 250 is connected to an interface 252 of the transmission 208 via a transmission communication channel 254. The interface 252 may include structures that can selectively alter an equivalent gear ratio to a desired equivalent gear ratio, in the case of a CVT, or alternatively engage and disengage various gear sets of the transmission 208 in response to commands from the transmission controller 250. The interface 252, which is shown as a single component but which may alternatively be made of a collection of sensors and actuators associated with the transmission 208, may additionally provide information to the transmission controller 250 indicative of the current gear engagement state of the transmission 208, as well as other information, such as the power transmitted to the wheels through the transmission 208, the speed of the output shaft 212, the speed of the shaft 204, and the like. During operation, the transmission controller 250 may command gear ratio changes to the transmission 208 based on predetermined speed thresholds for up-shift and downshift changes, or may alternatively cause the transmission 208 to assume a desired equivalent gear ratio commanded by the operator via the gear selector lever 224 or other equivalent manual or automated transmission command means.

In the illustrated embodiment, information may be exchanged between the engine governor 232 and the transmission controller 250 via a data bus 256, but it should be appreciated that, although the engine governor 232 and the transmission controller 250 are shown as separate components, they may alternatively be integrated into a single control unit or separated into more than two control units. Thus, either of the engine governor 232 and/or the transmission controller 250 may be a single controller or may include more than one controller disposed to control various functions and/or features of a machine. For example, a master controller, used to control the overall operation and function of the machine, may be cooperatively implemented with a motor or engine controller, used to control the engine 201. In this embodiment, the terms "controller" or "governor" are meant to include one, two, or more controllers that may be associated with the machine 100 and that may cooperate in controlling various functions and operations of the machine 100 (FIG. 1). The functionality of these devices, while shown conceptually in the figures that follow to include various discrete functions for illustrative purposes only, may be implemented in hardware and/or software without regard to the discrete functionality shown. Accordingly, although various interfaces of the controller are described relative to components of the powertrain system in the figures that follow, such interfaces are not intended to limit the type and number of components that are connected, nor the number of controllers that are described.

At various times during operation, an operator may command a relatively low engine speed but at a high engine load output. At these conditions, the transmission has the capability of producing the desired ground speed, but the likelihood of engine overheating is increased when high engine operating load is present. As can be appreciated, high engine load can increase engine exhaust temperature, while low engine speed can reduce cooling capacity of the cooling system 202 because of, in part, lower induced airflow caused by low rotational speed of the engine fan 207. Under such conditions, the governor may include appropriate algorithms that can detect the presence of such conditions and reduce the power of the transmission. Transmission power reduction can be accomplished by reducing, for example, the torque transmitted by the transmission. In the illustrated embodiment, transmission output power is reduced via appropriate control of transmission operation, but it should be appreciated that any suitable modes of reducing transmission power throughput can be used. Also in the illustrated embodiment, engine power is maintained unaffected, for example, without de-rating the engine, but in alternative embodiments the maximum possible engine power output may also be reduced. The transmission power reduction can be temporary, while the triggering operating conditions are present and, in some embodiments, can include providing a warning or alert to the operator before reducing power such that corrective action can be taken without substantially intruding on the machine's operation.

The control algorithms in accordance with this method can account for a sufficient transmission power reduction to achieve an engine or machine load factor limit that matches the cooling ability of the system for those engine and transmission settings. In one exemplary embodiment, transmission output power may be limited by between 10% and 50% when the engine is operating below a threshold engine speed.

Figure 3:
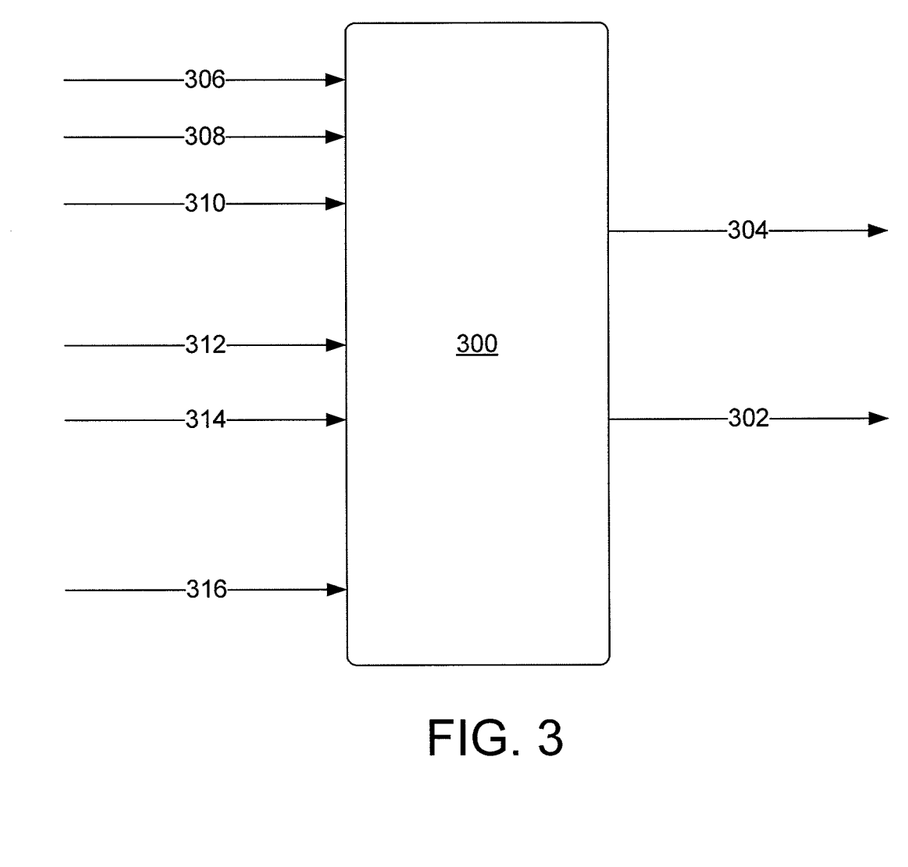
FIG. 3 is a block diagram for a transmission power controller in accordance with the disclosure.

One embodiment for a control algorithm 300 is shown in FIG. 3. The control algorithm 300 receives various machine operating parameters as inputs and, on the basis of these parameters, provides appropriate outputs that can limit transmission power output under low speed and high load engine operating conditions. In the illustrated embodiment, additional inputs are shown that can permit the algorithm 300 to determine the cooling capacity of the machine engine system, in real time. In the illustrated embodiment, the control algorithm 300 may be operating within the engine governor, for example, governor 232 shown in FIG. 1, and provide appropriate commands to the transmission controller 250, which controls and adjusts operation of the transmission 208.

Accordingly, the control algorithm 300 provides a transmission output torque limit 302 and, optionally, an alert signal 304. The transmission output torque limit 302 may be a signal indicative of the maximum allowed torque at the output of the transmission, for example, the output shaft 212 of the transmission 208, as shown in FIG. 2. Such signal may be provided from the governor 232 to the transmission controller 250 via the bus 256. The alert signal 304 may be a signal that is activated when the control algorithm 300 is activated to reduce transmission power output and cause, in an appropriate manner, an audible, visual and/or other type of notification to be provided to the operator, for example, by sounding a buzzer, illuminating a lamp and other known methods for displaying information to a machine operator.

Inputs to the control algorithm 300 may include various machine and/or engine operating parameters. In the illustrated embodiment, the control algorithm receives signals indicative of engine speed 306, transmission output speed 308 and other transmission torque limits 310. The engine speed 306 may be provided by a sensor associated with the engine and configured to provide a signal indicative of the rate of rotation of an engine output shaft, for example, the engine speed sensor 238 (FIG. 2). Transmission output speed may be provided by a drive-train sensor configured to provide a signal indicative of the transmission output speed, for example, the drive-train sensor 247 shown in FIG. 2. The other torque limits 310 may include various normal limitations on transmission output torque, for example, operator controls, transmission operation suspension when a service brake of the machine is engaged, and the like.

Optionally, the control algorithm 300 may further receive signals indicative of the engine cooling capacity of the machine. Such signals may include engine coolant temperature 312, ambient temperature 314, ground speed 316, and the like. The control algorithm may further receive signals indicative of the operating state of the machine cooling system such as the operating state of a thermostat, for example, the thermostatic valve 218 (FIG. 2). In the illustrated embodiment, such signals can be provided by various sensors such as the engine coolant sensor 260 and other sensors, or by signals monitoring various commands provided to system and/or engine actuators. These signals may be useful in calculating or otherwise determining the cooling capacity of the powertrain 200 under real operating conditions, but such calculations may be optional and omitted in favor of predetermined cooling capacity assumptions, which can be used to provide consistent and repeatable machine operation under any environmental conditions.

Figure 4:
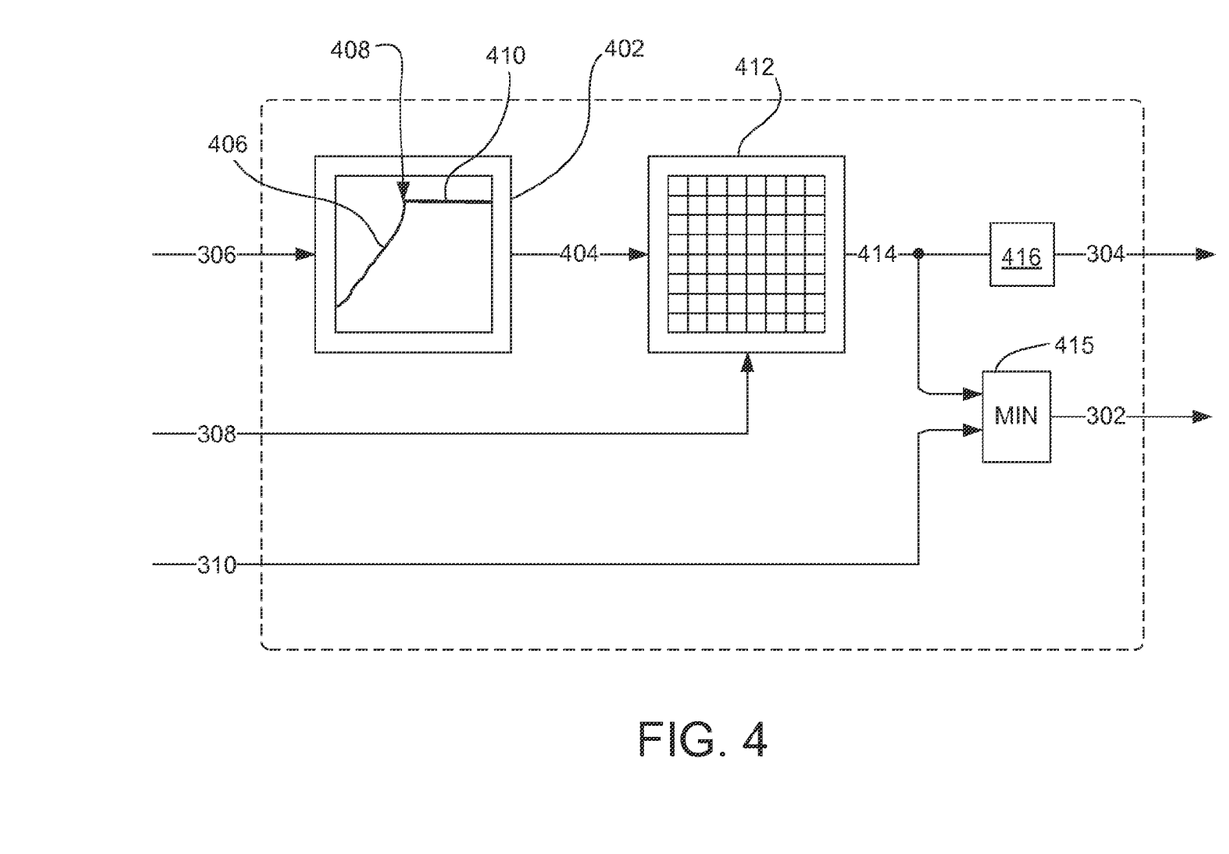
FIG. 4 is a block diagram for an exemplary implementation of a transmission power controller in accordance with the disclosure.

A particular implementation for one embodiment of the control algorithm 300 is shown in FIG. 3. In this embodiment, the various optional signals that can permit calculation of the system cooling capacity have been omitted in favor of predetermined cooling capacity assumptions for the system that are incorporated in the control scheme shown. Accordingly, the particular implementation of the control algorithm 300 shown in FIG. 4 receives as inputs engine speed 306, transmission output speed 308, and a torque limit 310. The engine speed 306 is provided to a function or lookup table 402 that is populated or provides a value for the maximum transmission output power 404 that corresponds to any given engine speed 306 input. The maximum transmission output power 404 provided by the lookup table 402 is pre-determined based on the maximum cooling capability of the engine for the corresponding engine speed. As shown in the illustration of FIG. 4, the lookup table 402 is configured to provide an increasing transmission power with increasing engine speed over a controlled region 406 until a maximum engine speed 408 is reached. For engine speeds above the maximum engine speed 408, a power limit 410 is provided that is maintained relatively constant for increasing engine speed. In this way, a maximum transmission output power value or limit is provided for each engine speed value. For higher engine speed values, the transmission power limit is increased, but for lower engine speed values, the power limit is decreased.

The maximum transmission output power 404 is provided to a power to torque correlation function or, as illustrated, a power to torque lookup table 412. The lookup table 412 receives as a second input the transmission output speed 308, which is indicative of transmission output torque when correlated to transmission output power. Viewed from a different perspective, the transmission output speed 308 can also be indicative of or at least correlated to machine ground speed insofar as the output of the transmission drives the ground engaging members of the machine either directly or indirectly. The power to torque lookup table 412 is populated with predetermined values for transmission output torque limits 414, which are determined, for example, by interpolation, based on the then present transmission output power 404 limit and transmission output speed 308. The transmission output torque limit 414 is appropriately selected to maintain engine operation within acceptable parameters and within the capability of the engine cooling system for each operating condition.

The transmission output torque limit 414 is compared with the externally provided torque limit 310 at a comparator 415. The minimum torque value between the transmission output torque limit 414 and of the other torque limits 310 is selected and provided as an output of the control algorithm 300 as the final transmission output torque limit 302. In those instances when a transmission torque limit 414 is used to limit transmission torque, a sentry function 416 may provide the alarm signal 304, informing the operator that a limit to the machine's operation has been invoked.

INDUSTRIAL APPLICABILITY

Figure 5:
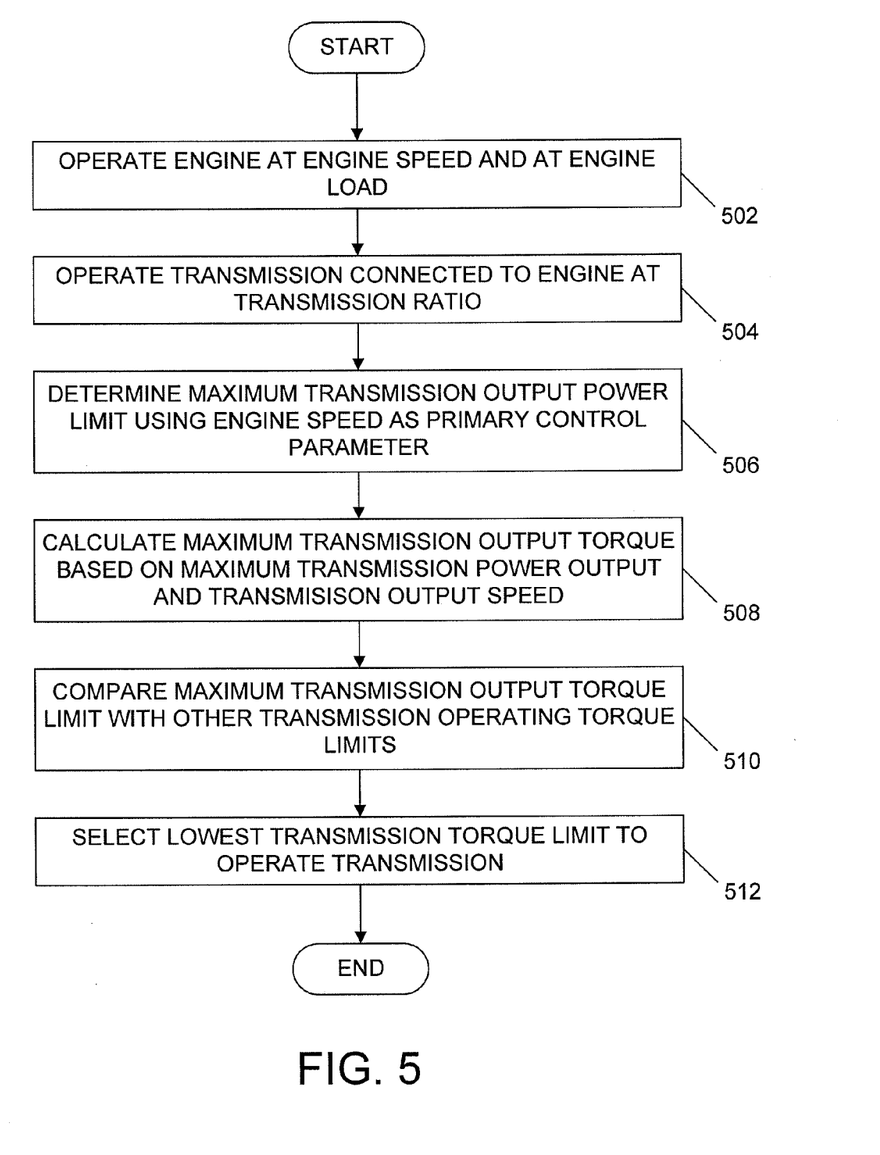
FIG. 5 is a flowchart for a method of controlling transmission power in accordance with the disclosure.

The present disclosure is applicable to machines and, more particular, to machines having a finite engine cooling capacity for engines operating transmissions capable of causing the engine to overheat when the engine operates at high load and low speed conditions. One exemplary method for limiting transmission output power based on engine operating conditions to prevent engine overheating under certain operating conditions is shown in the flowchart of FIG. 5.

In accordance with the illustrated method, the engine is operated at an engine speed and engine load at 502, and the transmission is operated at an equivalent gear ratio or other operating condition at 504. The engine speed is used as a primary control parameter to determine a maximum transmission output power limit at 506. In one embodiment, the maximum transmission output power limit corresponds to a cooling system capacity limit that is required to avoid engine overheating or, stated differently, a cooling system capacity that is required to maintain the engine's operating temperature within an acceptable operating range.

The maximum transmission output power is converted to a maximum transmission output torque based on the a transmission output speed at 508. The maximum transmission output torque corresponds to the torque limit at the output of the transmission that, at the then present engine speed, allows for sufficient capacity in the engine cooling system to maintain an acceptable engine operating temperature and avoid engine overheating.

The maximum transmission output torque limit is compared with other transmission operating torque limits at 510, and the lowest transmission torque limit is selected at 512 to operate the transmission.

It should be appreciated that the systems and methods described herein can be implemented in various forms. For example, an engine torque output limit can be imposed instead of or in addition to the torque limits described, for example, by de-rating the engine's output power on the basis of engine speed. Moreover, the steps of determining the maximum transmission output power and/or torque can be accomplished by use of extrapolation or interpolation on the basis of predetermined values, for example, using lookup tables, or may alternatively be calculated based on an estimation of the engine cooling capacity of the system. When estimating such cooling capacity, additional parameters such as engine coolant temperature, ambient temperature, altitude, transmission oil temperature, ground speed, cooling fan speed, and other parameters affecting the convective cooling of an engine's radiator may be used.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A machine, comprising:
   an engine;
   an engine cooling system associated with the engine and configured to remove engine heat from the engine;
   a transmission, the transmission connected to the engine and configured to transmit engine power from the engine to a driven load, the transmission controlling an amount of engine power transmitted to the driven load in response to a transmission command signal;
a controller associated with the engine and the transmission, said controller providing the transmission command signal, the controller disposed to:
   determine an engine operating condition including a current engine speed;
   determine a transmission operating condition; and
   adjust the transmission command signal to reduce the amount of engine power transmitted to the driven load, while the engine continues to operate at the current engine speed, and when the engine operating condition indicates that the engine cooling system removes insufficient heat from the engine, such that the amount of engine power transmitted to the driven load allows for sufficient capacity in the engine cooling system to maintain an acceptable engine operating temperature and avoid engine overheating.

2. The machine of claim 1, wherein the transmission is a continuously variable transmission (CVT), and wherein the engine cooling system may remove insufficient engine heat under low engine speed and high engine load conditions.

3. The machine of claim 1, wherein the transmission operating condition includes a transmission output speed, and wherein adjusting the transmission command signal to reduce the amount of engine power transmitted to the driven load is accomplished when the engine speed is below a threshold engine speed value.

4. The machine of claim 3, wherein the controller includes a correlation between a plurality of threshold engine speed values and corresponding reduced power amounts that the transmission transmits to the driven load, wherein the controller further includes a correlation between the reduced power amounts and transmission speed, which provides a maximum transmission output torque limit, and wherein the controller adjusts the transmission command signal based on the maximum transmission output torque limit.

5. The machine of claim 1, wherein the driven load is a machine propel system that includes one or more ground engaging members.

6. The machine of claim 1, wherein the machine is a motor grader.

7. The machine of claim 1, wherein reducing the amount of engine power transmitted to the driven load does not limit an engine power output.

8. A cooling-based power limiting system, comprising:
a power plant producing useable power, wherein the power plant is an internal combustion engine;
a cooling unit associated with the power plant and having a cooling capacity that depends on power plant operating conditions;
a driven system operating on the useable power, wherein the driven system is a propel system that includes at least one ground engaging member;
a transmission connected between the power plant and the driven system and configured to transfer power therebetween, said transmission implementing a power limit when transferring power from the power plant to the driven system in response to a transmission power limit command, wherein the power limit of the transmission is a torque limit at an output of the transmission that is connected to the propel system; and
a controller associated with the power plant, the cooling unit and the transmission, the controller being configured to lower the power limit of the transmission when the power plant is operating under a condition in which the cooling capacity is insufficient to cool the power plant, wherein the controller is disposed to:
   determine an engine speed of the internal combustion engine;
   determine a transmission output speed of the transmission;
   calculate a maximum transmission output power based on the engine speed, the maximum transmission output power depending on a maximum cooling capacity of the cooling unit;
   calculate a maximum transmission output torque limit based on the maximum transmission output power and the transmission output speed;
   compare the maximum transmission output torque limit with other transmission output torque limits;
   select a lowest one of the maximum transmission output torque limit and the other transmission output torque limits; and
   provide the transmission power limit command based on the lowest one of the limits.

9. The cooling-based limiting system of claim 8, wherein lowering the power limit of the transmission in the controller has no effect on an allowable power output of the power plant.

10. The cooling-based limiting system of claim 8, wherein conditions in which the cooling capacity is insufficient to cool the power plant occurs when the power plant is operating at a high power output and a low speed.

11. The cooling-based limiting system of claim 8, wherein the power plant is an internal combustion engine mounted on a machine, and wherein the driven system is a machine propel system that includes at least one ground engaging member.

12. A method for limiting power transmitted from an engine through a transmission in a machine powertrain, the engine associated with a cooling system, the method comprising:
operating the engine at an engine speed and engine load;
operating the transmission at a transmission ratio;
determining a maximum transmission output power limit using the engine speed as a primary control parameter based on a cooling capacity of the cooling system;
calculating a maximum transmission output torque limit based on the maximum transmission output power limit and a transmission output speed;
comparing said maximum transmission output torque limit with other transmission output torque limits;
using a lowest one of said limits to adjust the transmission ratio such that the transmission operates below the lowest one of said limits; and
adjusting the transmission ratio based on the maximum transmission output power limit.

13. The method of claim 12, further comprising determining a maximum transmission output torque limit based on the maximum transmission output power limit and a transmission output speed.

14. The method of claim 12, wherein a maximum allowable engine load remains unchanged when the transmission ratio is adjusted.

15. The method of claim 12, wherein adjusting the transmission ratio is carried out when the engine speed is below a corresponding engine speed threshold and a transmission output torque is above a corresponding transmission torque threshold.

16. The method of claim 12, further comprising providing an alert to a machine operator when adjusting the transmission ratio.

17. The method of claim 12, further comprising estimating the cooling capacity.

\* \* \* \* \*